March 28, 1939. H. F. GREENE, SR 2,152,253
HUB CAP
Filed Dec. 16, 1937
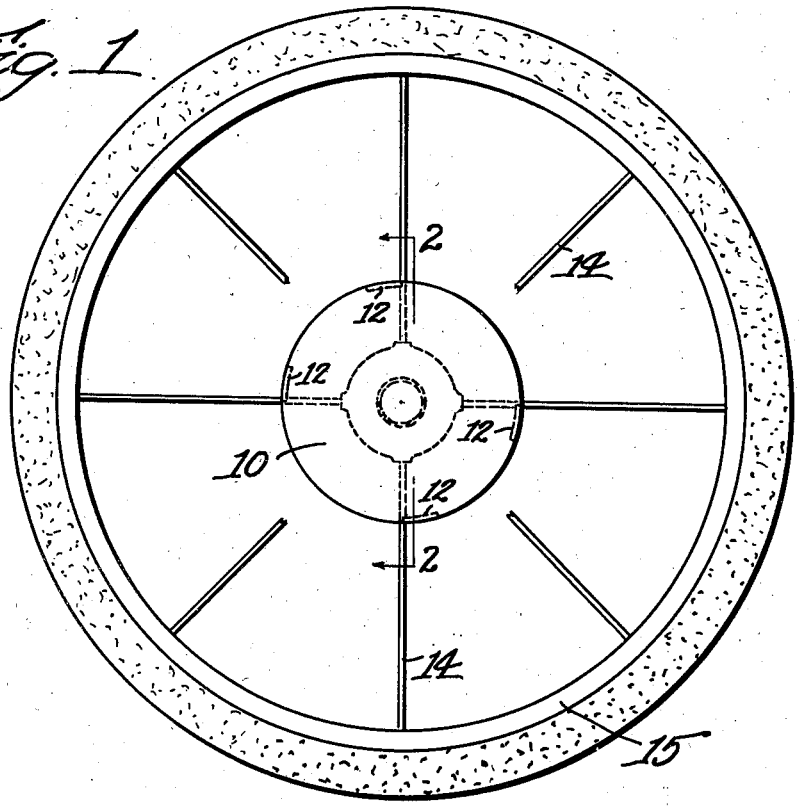
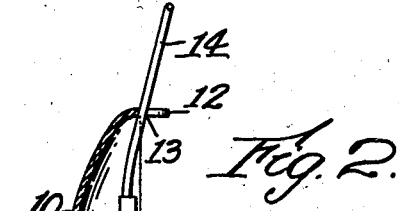
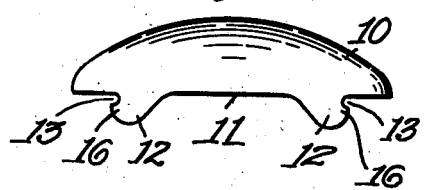
Inventor
Henry F. Greene, Sr.

Patented Mar. 28, 1939

2,152,253

UNITED STATES PATENT OFFICE 2,152,253

HUB CAP

Henry F. Greene, Sr., East Templeton, Mass., assignor to Gardner Tool and Stamping Company, a partnership composed of Paul V. Anderson, William Le Clair, and himself Application December 16, 1937, Serial No. 180,203

3 Claims. (Cl. 301—108)

This invention relates to a hub cap for the wheel of a bicycle, velocipede, or similar vehicle.

The principal objects of the invention are to provide a very simple and inexpensive hub cap with means by which it can be attached to the spokes of a wheel of a bicycle, velocipede, or similar vehicle and in which the resiliency of the wire spokes of the wheel is utilized for the purpose of retaining the hub cap in position so long as desired but not to prevent the removal of the same; to provide a construction of hub cap in which it can be removably retained in place without involving any relatively movable parts or any adjustment for attaching it or removing it, and to provide a hub cap having these qualities in which no extra wires are required to hold it in place and no screw threads and there is no necessity of changing the shape of the cap in order to properly fasten it to the spokes.

Other objects and advantages of the invention will appear hereinafter.

Reference is to be had to the accompanying drawing, in which

Fig. 1 is a front view of a wheel having wire spokes with a preferred embodiment of this invention applied thereto;

Fig. 2 is a sectional view of the same on the line 2—2 of Fig. 1, and

Fig. 3 is an edge view of the cap.

In order to provide a simple and inexpensive hub cap having the above mentioned advantages the cap 10 is made of suitable quality and thickness of sheet metal having a convex outer surface to enable the nut and other parts of the vehicle to be properly housed. This cap is made circular and its edge 11 is brought to a position in which it constitutes the beginning of a cylindrical body. In other words, at the edge it is substantially cylindrical. This edge 11 is provided with a series of ears 12, each one of which is provided with a notch 13 for receiving the wires 14 of the wheel 15 to which it is applied. These notches are partly circular, preferably semi-circular in shape. It will be observed that in the two adjacent ears the notches are on opposite sides and, of course, in the next two ears the notches are on the inside, so to speak. The result of this is that the placing of the cap in position is extremely simple. The ears are placed between the spokes in an obvious manner and each one engaging a spoke and then the cap is pressed against the spokes, by hand, if desired, until the wire spokes yield to enter said notches all around the cap. This means that two adjacent wire spokes are pressed toward each other by the tips 16 of the ears, while the cap is being applied, and then the spokes spring back into these notches 13. Each pair of ears with its notches holds two adjacent spokes between them. These spokes naturally tend to spring into their natural position spaced away from each other. Therefore, the same condition prevails all around the cap and the latter is held firmly in position, although the holding means is resilient.

It will be obvious that while two spokes are held between two ears in this way the next two ears have no spokes between them and the pairs of ears which hold the spokes between them alternate with the ears which do not.

In order to detach the cap it is only necessary to exercise sufficient force to flex the spokes enough to release them from their holding notches which comes to the sharp point 16 at their inner ends beyond the notches. This constitutes a very simple and inexpensive cap which can be made by cutting and pressing in a very simple manner. It avoids the use of anything except one piece of metal. That is, there are no springs, screw threads or other fastening devices involved and yet it is held in as rigid a condition as is required in this industry.

Having thus described my invention and the advantages thereof, I do not wish to be limited to the details herein disclosed, otherwise than as set forth in the claims, but what I claim is:

1. As an article of manufacture, a hub cap comprising a sheet metal disc, its edge being provided with ears projecting therefrom and each ear having a notch in the edge thereof, the notches on two adjacent ears being on the sides thereof which project toward each other, said ears being arranged in pairs around the circumference of the cap.

2. As an article of manufacture, a hub cap comprising a convex circular disc provided with an edge extending in cylindrical form therefrom, said edge being provided with ears projecting as a part of the cylinder and each ear having a notch in the edge thereof constituting a part of a circle, the notches on two adjacent ears being on the sides thereof which project toward each other, said ears being arranged in pairs around the circumference of the cap.

3. As an article of manufacture, a hub cap comprising a convex circular disc provided with an edge extending in cylindrical form therefrom, said edge being provided with ears projecting in the cylinder and each ear having a notch in the edge thereof constituting a part of a circle, the notches on two adjacent ears being on the sides thereof which project toward each other, and those on the next two adjacent ears being in the sides projecting toward each other, said ears being arranged in pairs around the circumference of the cap.

HENRY F. GREENE, Sr.